April 15, 1924.　　　　　L. C. ZWIEBACK　　　　　1,490,526

AUTOMOBILE TRAFFIC SIGNAL

Filed June 6, 1921　　　　2 Sheets-Sheet 1

Inventor.
Louis C. Zwieback,
By James T. Burkeley
his Attorney

April 15, 1924.
L. C. ZWIEBACK
1,490,526
AUTOMOBILE TRAFFIC SIGNAL
Filed June 6, 1921  2 Sheets-Sheet 2
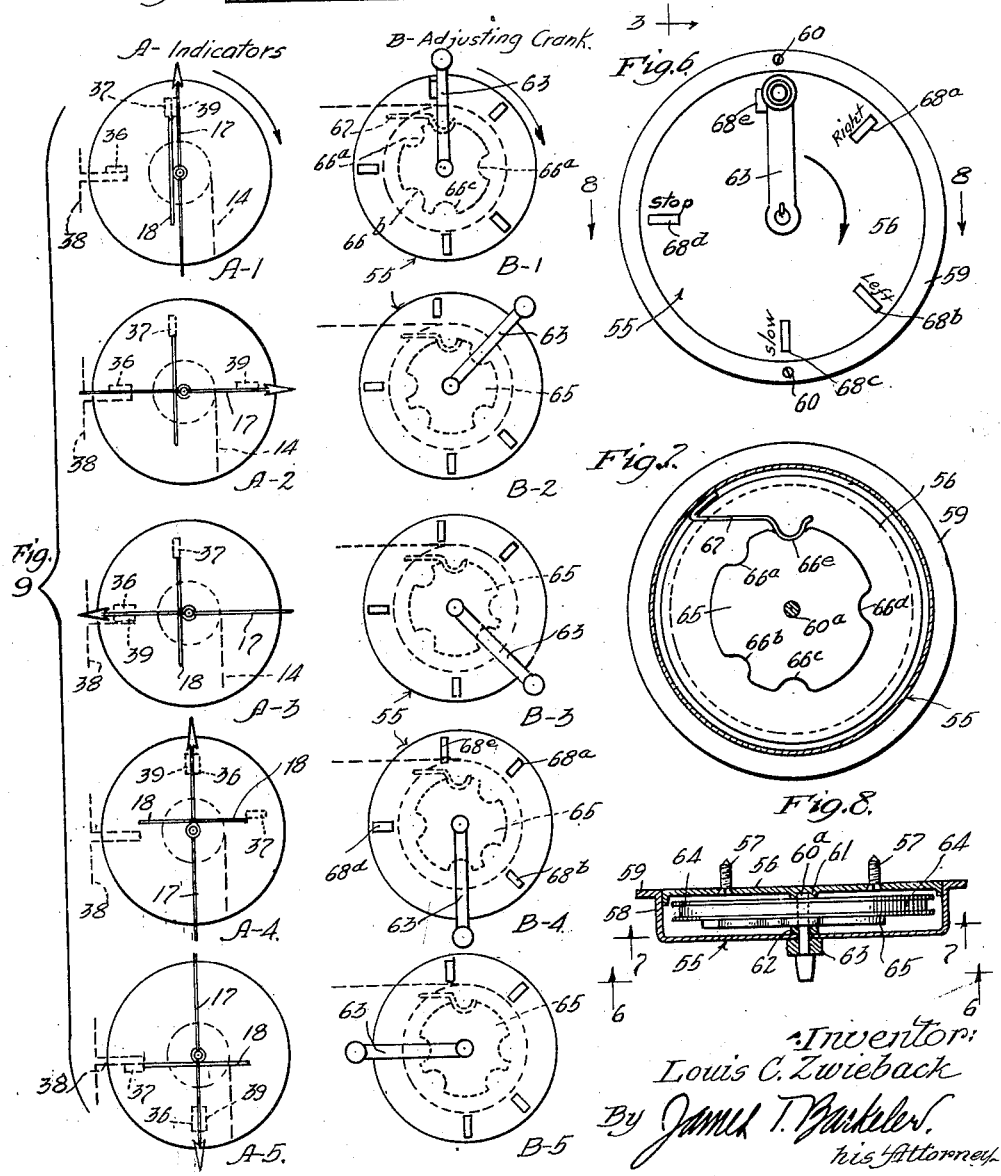

Patented Apr. 15, 1924.

1,490,526

UNITED STATES PATENT OFFICE.

LOUIS C. ZWIEBACK, OF LOS ANGELES, CALIFORNIA.

AUTOMOBILE TRAFFIC SIGNAL.

Application filed June 6, 1921. Serial No. 475,539.

*To all whom it may concern:*

Be it known that I, LOUIS C. ZWIEBACK, a citizen of the United States, residing at Los Angeles, in the county of Los Angeles and State of California, have invented new and useful Improvements in Automobile Traffic Signals, of which the following is a full, clear, and accurate disclosure.

The present invention relates to traffic signals, for motor vehicles and the like, and particularly to direction indicators of the type adapted to visually indicate the operator's intention of turning the vehicle to the right or left, or of slowing down or stopping it. My foremost object is to provide a mechanical device to fill the requirements imposed by law in many States, of the driver's giving visual signals of his intended movements of the vehicle; one which is adapted to be conspicuously mounted on the vehicle, such as the front and rear ends, or either of them, and operable from the driver's seat.

My invention, as hereinafter shown and described in its preferred specific embodiments, is simple in construction and operation, durable, and inexpensive to manufacture; and, as will clearly appear from the following detail disclosure, may be either manually or electrically operated.

A particular feature of the invention is the arrangement of two separate and distinct signalling members, one operable to indicate right and left hand turns and the other operable to indicate a reduction in speed, or stopping of the vehicle; each of these members being arranged to move to or remain in inoperative or non-signalling position, while the other is in signalling position.

Figure 1:
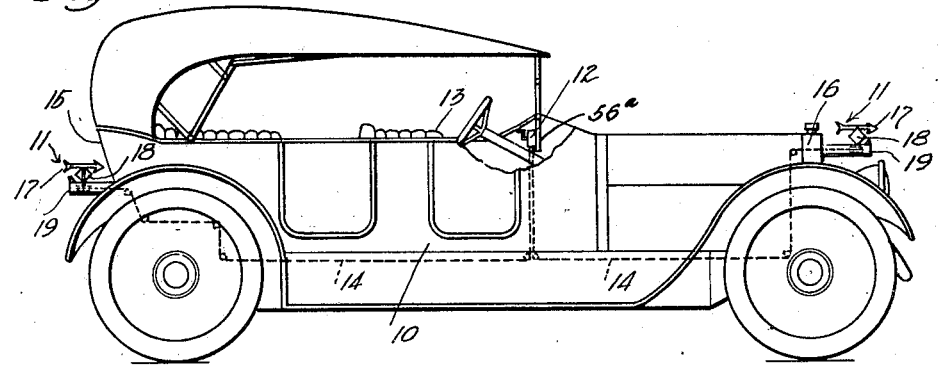
Figure 2:
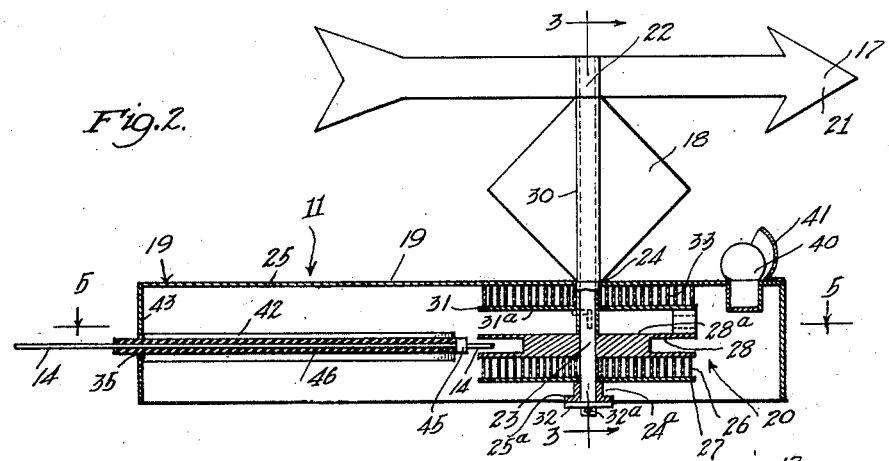
Figure 3:
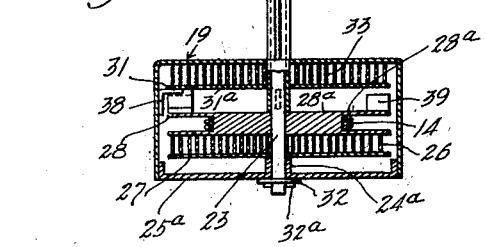
Figure 4:
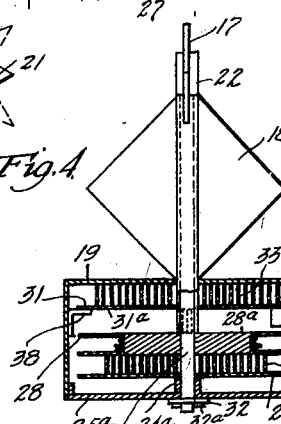

The merits of my invention will be more fully set forth in the following specification, reference being made therein to the accompanying drawings forming a part thereof, and in which drawings the several views may be briefly described as follows:

Fig. 1 is a side elevation of a typical motor vehicle, showing the application of my invention thereto; Fig. 2 is an enlarged longitudinal or side elevation of the signalling device, the immediate actuating mechanism being shown in longitudinal vertical section, as indicated by the line 2—2 of Fig. 5; Fig. 3 is a transverse vertical section taken through the actuating mechanism housing as indicated by the line 3—3 of Fig. 2, showing the signalling members in elevation; the right and left hand turn signal member being shown in operative position and the slowing and stopping signalling member in inoperative position; Fig. 4 is a view similar to Fig. 3 only showing the right and left hand turn signalling member in inoperative position and the slowing and stopping signalling member in operative position; Fig. 5 is a sectional plan view of a portion of the actuating mechanism, this section being taken as indicated by the line 5—5 of Fig. 2; Fig. 6 is an enlarged front elevation of the manual actuating lever, and its mechanism housing, mounted adjacent the driver's seat; Fig. 7 is a vertical section therethrough, taken as indicated by the line 7—7 of Fig. 8; Fig. 8 is a transverse plan section, taken as indicated by the line 8—8 of Fig. 6; and Fig. 9 is a diagrammatic layout showing the relative movements of the signalling members and the manual actuating lever throughout one complete signalling operation.

Referring now to the drawings, the numeral 10 designates a typical motor vehicle showing my signalling devices, designated by the numeral 11, mounted upon the front and rear ends thereof; these devices being operatively connected through the medium of cables 14 with a manually operable actuating mechanism 12, mounted in any convenient place adjacent the driver's seat 13. While the signalling devices 11 are here shown as being conspicuously mounted upon the extreme front and rear ends of the body portion of the vehicle, such as the center of the back 15, and above the radiator 16, it is to be understood that they may be mounted at any other suitable places upon the vehicle, to accomplish their desired purpose; and operatively connected to the mechanism 12, by the cables 14, in any other suitable or convenient manner.

Referring now particularly to Figs. 2 to 5, inclusive, the signalling device 11 comprises essentially an arrow shaped signalling member 17, for indicating the right and left hand turns, and a square or diamond shaped signalling member 18, for indicating the slowing down or stopping of the vehicle; each independently pivotally mounted upon a suitable housing or casing 19, containing a portion of the actuating mechanism, generally designated by the numeral 20. For convenience of description the member 17 will be hereinafter referred to as the turning signal member, and the member 18 will be referred to as the stop signal member. It is obvious, of course, that the precise shape of these signal members is not a dominant feature of my invention; but it is preferable that they be of such configurations as to be clearly distinguishable from each other.

The turning signal member 17 consists of a flat strip of sheet metal, preferably cut to the configuration of an arrow; the head 21 thereof being adapted to point—as is usual—in the direction the vehicle is about to turn. The member 17 has a bearing portion 22 by which it is rigidly mounted upon a vertically disposed shaft 23; this shaft extending through an aperture 24 in the top 25 of the casing 19; being revolubly journaled at its lower end in a suitable bearing 24$^a$, supported upon a transverse brace member 25$^a$, which in turn is rigidly supported upon the side walls of the casing 19.

A spiral spring 26 surrounds the shaft 24, being confined between a circular disk 27, rigidly secured to the shaft 24, and one face of a spool or reel 28, likewise secured to the shaft 24; one end of said spring being soldered or otherwise secured to the side of the casing 19—as at 29—the opposite end being secured to the shaft 24. This spring is adapted to rotate the shaft 24, together with the reel 28 rigidly mounted thereon, in the direction indicated by the arrow in Fig. 5. The disc 27 rests upon the top of the bearing 24$^a$ and is held in such contact by means of a washer 32 fitted to the lower end of the shaft 23 and held in engagement with the bottom face of the bearing member 24 by means of a pin 32$^a$.

The stop signal member 18 is rigidly mounted upon a tubular shaft 30, surrounding the shaft 24 and adapted to rotate freely thereon; the shaft 30 extending through the aperture 24 in the top of the case 19; being confined between the bearing portion 22, of the member 17, and the top face 28$^a$ of the reel 28, and having its main bearing on the latter. A circular disk 31 is rigidly secured adjacent the lower end of the shaft 30, within the casing 19, this disk being mounted in spaced relation to the top 25. A spiral spring 33 is confined between the disc 31 and the top 25 of the casing, being likewise secured at one end—as at 34—to the casing 19, and at its other end to the shaft 30, and likewise tending to rotate the shaft 30 in the direction indicated by the arrow in Fig. 5.

The cable 14 is rove around and secured at one end to the spool 28 in the manner shown (passing outwardly through an aperture 35 in the rear end of the casing 19), to actuate the signalling members through the medium of the mechanism hereinbefore described, as will be hereinafter explained, and thence to the manual actuating mechanism 12, mounted upon the vehicle adjacent the driver's seat.

As is shown on the drawings, the signalling members 17 and 18 are adapted to normally extend when in inoperative position in a plane parallel with the longitudinal center of the vehicle 10, so that when viewed from the front or rear they will be practically unseen. As the springs 26 and 33 tend to rotate the shafts 23 and 30 in the direction indicated by the arrow in Fig. 5, and as the signalling members 17 and 18 are adapted to normally rest in a plane longitudinally of the vehicle 10 (which, in this case, is in a plane longitudinal of the casing 19), suitable stops are provided to properly hold these members in such normal inoperative position and against the action of the springs 26 and 33. These stops are in the form of lugs 36 and 37 secured to and depending from the bottom face 31$^a$ of the disk 31; the lug 36 engaging a lug 38 rigidly mounted upon and extending outwardly from one side of the casing 19, to hold the shaft 30 against the action of the spring 33; a lug 39, mounted upon and extending upwardly from the contiguous face 28$^a$ of the spool 28, being adapted to engage the lug 37 to hold the shaft 23 against the action of the spring 26. It will be noted that the lug 38 is so formed and positioned that it will be engaged by the lug 36, but will not interfere with the passage of the lug 39 thereunder, the particular reason for which will be hereinafter stated.

A light globe 40 may be mounted in the outer end of the casing 19 to so illuminate the signalling members as to be plainly visible at night; this light having a reflector 41 adapted to throw the light upwardly and upon the signalling members when either is in operative or signalling position, and being so positioned that these members will be practically invisible from the front or rear of the machine when inoperative or in non-signalling position. To further guard against illumination of the signalling members at night when in inoperative position, I have arranged a switch or contact in the lighting circuit whereby the light globe 40 will only be energized when either of the signalling members 17 and 18 are moved to signalling position. This switch comprises a pair of spring contact members 42, secured at one of their ends to the end wall 43 of the casing 19, as by means of suitable screws 44; the cable 14 carrying a metallic contact member 45 normally out of engagement with the members 42 and adapted to engage these members and close the circuit when the cable 14 is moved in the direction indicated by the arrow in the several figures of the drawings, to actuate the signalling members. In order that the cable 14 will be prevented from closing the circuit by connecting members 42, insulation 46 may surround the cable 14 throughout the length of the contact members and extend beyond their ends when the signal members are in normal inoperative position. The members 42 are of a length substantially equal to, or slightly greater, than the lineal movement of the cable 14, in moving the signal members to signalling position, so the light circuit will be closed by the contact member 45 during any one of the several directions indicating movements of the members 17 and 18.

Referring to the wiring diagram illustrated in Fig. 5, the light 40 is preferably placed in circuit with the tail light 47, which may be energized as from a battery 48 through electrical connectors 49 and 50; a switch 51 being provided therein to open and close the circuit. A ground wire 52 may connect the wire 50 and ground in the casing 19; while a wire 53 may connect the wire 49 with one of the contacts 42, and a wire 54 connected with the other contact 42 lead to the light bulb 40. Thus at all times that the tail light 41 is being energized the bulb 40 will be likewise energized through the medium of the contacts 42 and 45 when the cable 14 is moved to the proper position in actuating the signal members.

Referring now to Figs. 6, 7 and 8 wherein the manual actuating mechanism 12 is illustrated in detail, the mechanism is confined within a housing 55, consisting of a circular plate 56 adapted to be rigidly secured to the instrument board 56$^a$, adjacent the driver's seat (or in any other convenient locality) by means of suitable screws 57, and a circular casing 58 adapted to fit over the plate 56; the latter having an annular flange 59 through which screws 60 may extend to likewise secure this portion to the instrument board. A shaft 60$^a$ is revolubly journalled in bearings 61 and 62 of the plate 56 and casing 58, respectively; a hand crank 63 being keyed to the end of the shaft 60$^a$ protruding through the casing 58, in the manner shown. A reel 64 is rigidly mounted upon the shaft 60$^a$, within the casing 58, around which the cable 14 is rove and secured thereto. The reel 64 is preferably twice the diameter of the reel 28, so as to make their ratio one to two in the order named. A circular plate 65 is rigidly secured to the reel 64, concentric with the shaft 60, and notches 66$^a$, 66$^b$, 66$^c$, 66$^d$, and 66$^e$, cut in its periphery to be engaged by a spring detent 67, rigidly secured at one end to the casing 58, as shown.

Indicator marks 68$^a$, 68$^b$, 68$^c$ and 68$^d$ are placed on the outer face of the casing 58, these being respectively designated in the order of movement of the crank 63, as indicated by the arrow in Fig. 6, Right, Left, Slow and Stop, their spacing corresponding to the spacing of the notches 66$^a$, 66$^b$, 66$^c$ and 66$^d$ in the periphery of the plate 65.

The crank 63 is adapted to normally rest against a stop 68$^e$ in the position shown in Fig. 6, being retained there by the yielding action of the detent 67 engaging the notch 66$^e$ in the plate 65. The indicator 68$^a$ (Right) is 45° from this normal position of the crank 63; the indicator mark 68$^b$ (Left) 90° from the mark 68$^a$; the mark 68$^c$ (Slow) 45° from the mark 68$^b$, and the mark 68$^d$ (Stop) 90° from the mark 68$^c$; these angularities corresponding to the angularities between the notches 66$^e$, 66$^a$, 66$^b$, 66$^c$ and 66$^d$ in the order named so the detent 67 will engage the latter and yieldingly hold the crank 68 opposite the former. The reel 64 being twice the diameter of the reel 28, a movement of the crank 63 through an arc of 45° will rotate the reel 28 through an arc of 90°, a movement of the crank 63 through an arc of 90° will rotate the reel 28 through an arc of 180°.

Referring now to the diagrammatic layout illustrated in Fig. 9, the column A indicates the several movements of the indicators 17 and 18, while the column B indicates the corresponding several movements of the crank 63, and its mechanism, in actuating the indicators. In the diagram A$^1$ the turning indicator 17 and the stop indicator 18 are both shown in their normal inoperative positions, i. e., extending in a plane parallel with the longitudinal center of the vehicle; being held in this position by the action of the spring 33 holding the lug 36 of the stop indicator shaft 30 in engagement with the lug 38, and the action of spring 26 holding the lug 39 of the turning indicator shaft 23 in engagement with the lug 37 of the former. The diagram B$^1$ also shows the crank 63 in its normal inoperative position engaging the stop lug 68$^e$, and corresponding to the position of the indicator members 17 and 18 in the diagram A$^1$. When it is desired to make a right-hand turn, the crank 63 is moved to the position shown in diagram B$^2$, or through an arc of 45°, thus rotating the shaft 23 and the turning indicator 17 through an arc of 90°, to the right, as shown in diagram A$^2$. When it is desired to make a left-hand turn, the crank 63 is thrown to the position shown in diagram B$^3$, or through an arc of 135°, thus rotating the shaft 23 and the indicator 17 continuously through an arc of 270°, to the position shown in the diagram A$^3$. It may be here noted that any time after moving the crank 63 to any one of its several positions it will be held by the detent 67 engaging the corresponding notch 66, and when the crank 63 is manually returned to its normal inoperative position, against the stop 68$^e$, the action of the springs 26 and 33 will likewise return the corresponding indicator member to its normal position.

During the above described movement of the turning indicator 17 through arcs of either 90° or 270° to indicate right or left hand turns, respectively, the stop indicator 18 has remained in its normal inoperative position as shown in the diagrams A¹, A² and A³ being held by the action of its spring 33 and the lug 36 in engagement with the lug 38. If only right and left hand turns are to be indicated, the indicator 17 is returned from either of the positions shown in diagrams A² and A³, to that shown in diagram A¹, by movement of the crank 63 from either of the positions shown in diagrams B² and B³ to that shown in diagram B¹.

In case it is desired to slow down or decrease the speed of the vehicle, indication of this intention is given by moving the crank 63 from the position shown in diagram B¹ to that shown in diagram B⁴, thus moving the turning indicator 17 from the position shown in diagram A¹, through the position shown in diagram A² to that shown in diagram A³, where the lug 39 engages and picks up the lug 36 thus turning the stop indicator 18 to the position shown in diagram A⁴. The crank 63 has moved through an arc of 180° while the indicator 17 has made one complete revolution or 360°, and the indicator 18 turned 90°. Thus the stop signal is brought to an operative position transverse to the longitudinal center of the vehicle while the turning indicator 17 is in a plane parallel with the longitudinal center of the vehicle, or in a position to be practically invisible. If it is desired to stop the machine, the crank 63 is moved in one continuous movement from the position shown in diagram B¹ to the position shown in diagram B⁵, through an arc of 270°, thus moving the stop indicator 18 through an arc of 270°, or three-fourths of a revolution and the turning indicator 18 one and one-half revolutions, to the position shown in the diagram A⁵. Thus the stop signal 18 is visible while the turning signal 17 is still parallel to the longitudinal center of the vehicle the same as in diagram A⁴.

It may be here noted that the opposite faces of the stop signal may be suitably painted or marked to clearly distinguish between its slow and stop positions, either by painting the signs different colors or by painting thereon the words "Slow" and "Stop." It may be further noted that the crank 63 may be manipulated to give any one of the right, left, slow or stop signals, as any order of sequence, or from one to the other as described.

While I have herein shown and described the preferred specific embodiment of my device, it is nevertheless to be understood that I reserve the right to make any changes or modifications in structure which properly come within the scope of the appended claims. Particularly I may substitute a suitable electro-magnetic actuating means for the mechanism 12, this means being initially actuated by means of push buttons conveniently mounted adjacent the driver's seat.

Having described a preferred form of my invention, I claim:

1. In a device of the character described, the combination of a signal member for indicating right and left hand turns and a signal member for indicating a reduction in speed or stopping of the vehicle, said members normally extending in non-signalling positions longitudinally of the vehicle and being movable to extend in signalling positions transversely of the vehicle.

2. In a device of the character described, the combination of a signal member for indicating right and left hand turns and a signal member for indicating a reduction in speed or stopping of the vehicle, said members being concentrically mounted to rotate about a substantially vertical axis and to normally extend in non-signalling position longitudinally of the vehicle and being movable to extend in signalling position transversely of the vehicle.

3. In a device of the character described, the combination of a signal member for indicating right and left hand turns and a signal member for indicating a reduction in speed or stopping of the vehicle, said members being concentrically mounted to rotate about a substantially vertical axis and to normally extend in non-signalling positions longitudinally of the vehicle and being movable to extend in signalling positions transversely of the vehicle, said members being so arranged that when one is in signalling position the other will be in non-signalling position.

4. In a device of the character described, the combination of a signal member for indicating right and left hand turns and a signal member for indicating a reduction in speed or stopping of the vehicle, said members being concentrically mounted to rotate about a substantially vertical axis and to normally extend in non-signalling positions longitudinally of the vehicle and being movable to extend in signalling positions transversely of the vehicle, yielding means to normally hold said members in non-signalling position, and means to move said members into signalling position, said members being so arranged that when one is in signalling position the other will be in non-signalling position.

5. In a device of the character described, the combination of a signal member for indicating right and left hand turns and a signal member for indicating a reduction in speed or stopping of the vehicle, said members being concentrically mounted to independently rotate about a substantially vertical axis and to normally extend in non-signalling positions longitudinally of the vehicle and be movable to extend in signalling positions transversely of the vehicle, yielding means to normally hold said members in non-signalling positions, means to move said members successively into signalling positions, one of said members being first movable to its successive signalling position and having means to successively carry the other member to its signalling position, said members being so arranged that when one is in signalling position the other will be in non-signalling position.

6. In a device of the character described, the combination of a substantially flat signal member for indicating right and left hand turns, a substantially flat signal member for indicating a reduction in speed or stopping of the vehicle, said members normally extending in non-signalling position longitudinally of the vehicle and being pivotally mounted to be turned to extend in signalling position transverse of the vehicle, means to normally hold said members in non-signalling position, and means to move said members to signalling position.

7. In a device of the character described, the combination of a substantially flat signal member for indicating right and left hand turns, a substantially flat signal member for indicating a reduction in speed or stopping of the vehicle, said members normally extending in non-signalling position longitudinally of the vehicle and being pivotally mounted to be turned to extend in signalling position transverse of the vehicle, yielding means to normally hold said members in non-signalling positions, and means to move said members into signalling positions, said members being so arranged that when one is extending in signalling position transverse of the vehicle the other will extend in non-signalling position longitudinally of the vehicle.

8. In a device of the character described, the combination of a pivotally mounted signal member for indicating right and left hand turns, a pivotally mounted signal member for indicating a reduction in speed of the vehicle, yielding means to hold said members normally in non-signalling position, and a common means to move said members into signalling position, said members being so arranged that when one is in signalling position the other will be in non-signalling position.

9. In a device of the character described, the combination of a pivotally mounted signal member for indicating right and left hand turns, a pivotally mounted signal member for indicating a reduction in speed of the vehicle; spring means to hold said members normally in non-signalling position, and a common means to move said members into signalling position, said means being secured to one of said members to move it to signalling position, and means on said member to engage the other member and move it to signalling position, said members being arranged to be in non-signalling position when the other is in signalling position.

10. In a device of the character described, the combination of a signal member for indicating right and left hand turns and a signal member for indicating a reduction in speed or stopping of the vehicle, said members being concentrically mounted to rotate about a substantially vertical axis and to normally extend in non-signalling positions longitudinally of the vehicle and being movable to extend in signalling positions transversely of the vehicle, said members being so arranged that when one is in signalling position the other will be in non-signalling position, an illuminant for illuminating said signal members, and means for energizing said illuminant when the signal members are turned for signalling.

11. In a device of the character described, the combination of a signal member for indicating right and left hand turns and a signal member for indicating a reduction in speed or stopping of the vehicle, said members being concentrically mounted to rotate about a substantially vertical axis and to normally extend in non-signalling positions longitudinally of the vehicle and being movable to extend in signalling positions transversely of the vehicle, said members being so arranged that when one is in signalling position the other will be in non-signalling position, an illuminant for illuminating said signal members, positioned in alignment therewith longitudinal of the vehicle.

12. In a device of the character described, the combination of a substantially flat signal member for indicating right and left hand turns, a substantially flat signal member for indicating a reduction in speed or stopping of the vehicle, said members normally extending in non-signalling position longitudinally of the vehicle and being pivotally mounted to be turned to extend in signalling position transverse of the vehicle, yielding means to normally hold said members in non-signalling positions, and means to move said members into signalling positions, said members being so arranged that when one is extending in signalling position transverse of the vehicle the other will extend in non-signalling position longitudinally of the vehicle, an illuminant for illuminating said signal members, positioned in alignment therewith longitudinally of the vehicle, and means for energizing said illuminant when the signal members are turned for signalling.

13. In a device of the character described, the combination of a signal member for indicating right and left hand turns and a separate signal member for indicating a reduction in speed or stopping of the vehicle, said members being mounted to rotate about a common substantially vertical axis and to normally extend in non-signalling position longitudinally of the vehicle, means to normally hold said signalling members in non-signalling position, means to turn said members successively into signalling position, said means comprising an operating lever mounted remote from said device, and a single flexible connection between said lever and the signalling members whereby they are moved to signalling position against the action of said holding means.

14. In a device of the character described, the combination of a signal member for indicating right and left hand turns and a signal member for indicating a reduction in speed or stopping of the vehicle, said members being concentrically mounted to independently rotate about a substantially vertical axis and to normally extend in non-signalling positions longitudinally of the vehicle and be movable to extend in signalling positions transversely of the vehicle yielding means to normally hold said members in non-signalling positions, means to move said members successively into signalling positions, one of said members being first movable to its successive signalling position and having means to successively carry the other member to its signalling position, said members being so arranged that when one is in signalling position the other will be in non-signalling position, said signal moving means comprising an operating lever mounted remote from said device. and a single flexible connection between said lever and the signalling members whereby they are moved to signalling position against the action of said holding means.

In witness that I claim the foregoing I have hereunto subscribed my name this 28th day of May 1921.

LOUIS C. ZWIEBACK.